United States Patent
Psenka

[15] 3,656,401
[45] Apr. 18, 1972

[54] POT BROACHING MACHINE
[72] Inventor: Joseph A. Psenka, Bloomfield Hills, Mich.
[73] Assignee: Lear Siegler, Inc., Santa Monica, Calif.
[22] Filed: Mar. 5, 1970
[21] Appl. No.: 16,747

[52] U.S. Cl............................................90/10, 90/1, 90/86
[51] Int. Cl. .........................................................B23f 5/28
[58] Field of Search ........................................90/10, 86, 1

[56] References Cited

UNITED STATES PATENTS 3,541,921  11/1970  Helfer et al. ................................90/1
1,909,840  5/1933  Muller .......................................90/10

FOREIGN PATENTS OR APPLICATIONS 424,956  6/1933  Great Britain ............................90/10

*Primary Examiner*—Gil Weidenfeld
*Attorney*—Whittemore, Hulbert & Belknap

[57] ABSTRACT

A machine for broaching external gears comprising a frame, a pot broaching tool positioned with its axis vertical at the upper portion of the frame, a piston and cylinder device with its axis vertical located directly beneath the pot broach. The gear blank is positioned directly above a work support carried by the piston and is pushed upwardly through the pot broach to a position of clearance above. The cutting teeth of the broach are of course directed downwardly and each cutting tooth has a chip receiving space directly beneath it into which chips are formed during the broaching operation and from which chips are displaced for downward discharge.

4 Claims, 3 Drawing Figures

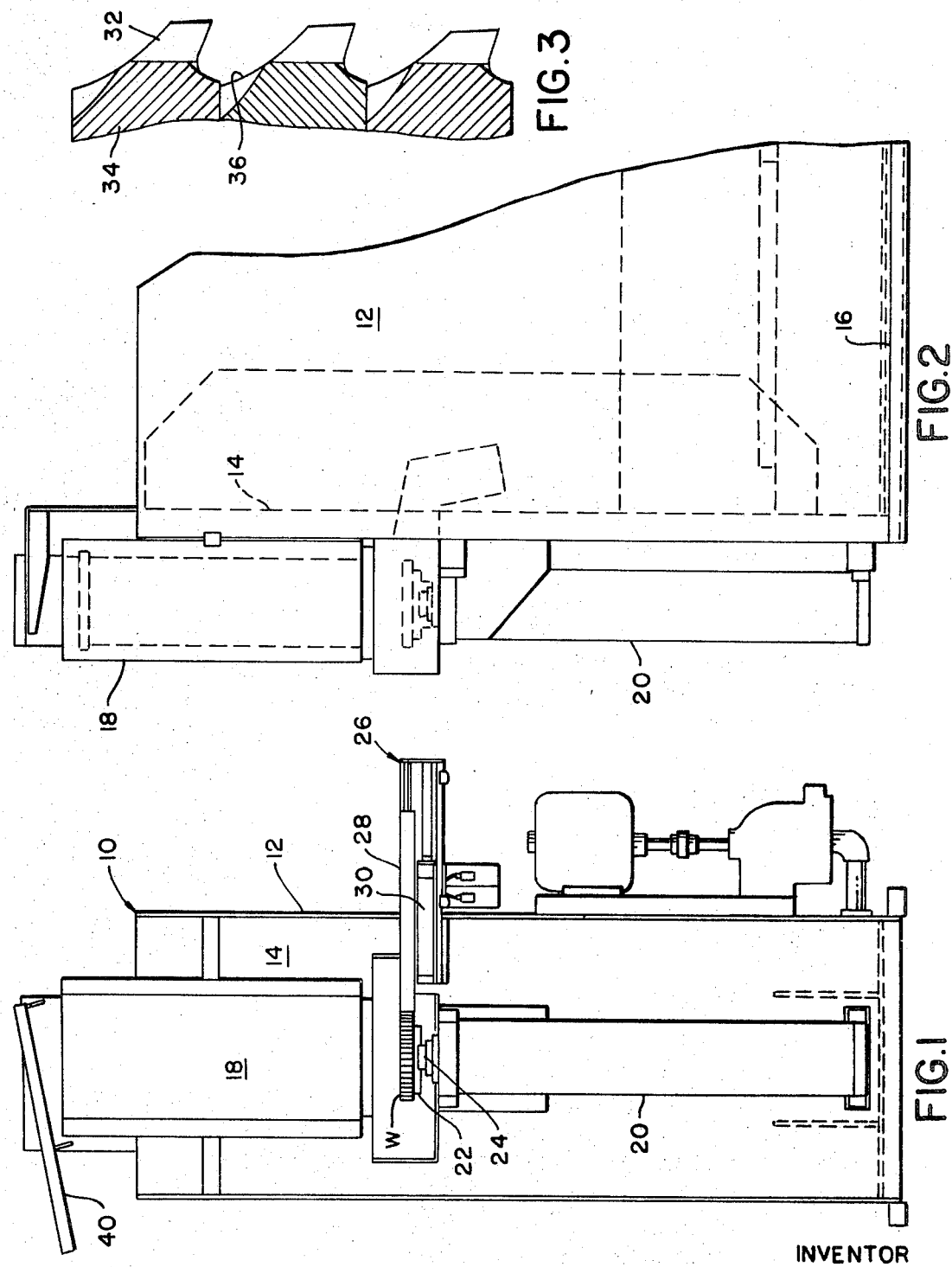

3,656,401

POT BROACHING MACHINE

BRIEF SUMMARY OF THE INVENTION

Machines for broaching all of the teeth on an external gear as a consequence of a single passage of a work blank through a generally tubular broach are known. The teeth of the broach are arranged in longitudinal alignment and are appropriately stepped to perform the required cutting operation. If the gear is to be broached is a spur gear the teeth are arranged in series extending parallel to the axis of the broach. If the gear is a helical gear the teeth are arranged in helically extending series.

In accordance with the present invention the generally tubular pot broach is rigidly supported in an elevated position with its axis vertical. Located directly beneath the broach is a piston and cylinder device in which the piston is displaced upwardly during a cutting stroke. A piston rod connected to the piston is connected to a work support above the piston which is adapted to receive and carry a gear blank upwardly through the broach.

A single passage of the gear blank upwardly through the broach results in a complete cutting operation forming the teeth as required on the periphery of the broach. The gear is moved upwardly above the upper open end of the broach into a clearance position relative to the broach. It is at this time moved from the work support to a downwardly directed chute.

Preferably, automatic means are provided for loading the machine and comprises means for advancing work blanks into a preliminary position directly above the work support. Upward movement of the piston causes the work support to pick up the gear blank and to transport it through the generally tubular broach.

BRIEF DESCRIPTION OF THE DRAWINGS

FIG. 1 is a front elevation of the broaching machine.
FIG. 2 is a side elevation of the machine shown in FIG. 1.
FIG. 3 is a fragmentary sectional view through the broaching tool.

DETAILED DESCRIPTION

Referring now to the drawings, the machine comprises a frame indicated generally at 10 which as illustrated comprises side plates 12 connecting to a front plate 14 and a bottom plate 16. Fixedly secured to this frame at the front thereof and adjacent its top is a pot broach 18 which comprises an outer shell or housing receiving a multiplicity of toothed cutting elements. Details of the broach itself form no part of the present invention but it may for example be of the type disclosed in my prior U.S. Pat No. 3,332,129.

Also fixedly carried by the frame 10 is a piston and cylinder device 20 in which a piston (not shown) is vertically movable. At the upper end of the piston and cylinder device 20 there is provided a work support 22 which is connected to the upper end of a piston rod 24.

Automatic loading mechanism is preferably provided and comprises a support 26 extending laterally from the frame and having work feeding mechanism indicated generally at 28 movable across the front of the machine by a feed piston and cylinder device 30 to position a work piece W directly above the work support 22.

Referring now to FIG. 3 there is a fragmentary sectional view showing the disposition of the cutting teeth in the broach. In this Figure the cutting teeth 32 on the broach are formed on the inner circumference of rings 34. Each of the rings is so shaped that a chip receiving recess is positioned directly below each cutting tooth which receives the chips during the broaching operation. As soon as a work piece has been moved upwardly past a particular ring, the chips which have been formed thereby in the space 36 may be dislodged by suitable means such for example as oil, and permitted to fall downwardly through the broach, by gravity.

At the top of the frame 10 there is positioned a discharge chute 40 into which cut gears are transferred by suitable means from the work support 22 for downward delivery by gravity.

The foregoing arrangement provides the most efficient relationship between the broach and the work advancing means and permits the machine to occupy a minimum vertical dimension. If desired, the lower end of the piston and cylinder device 20 may extend below the floor level.

In a particular machine the piston and cylinder unit has been selected to have a 45-inch stroke so that the location of the loading equipment 26 and the initial position of the work blank W, before it is advanced through the broach, is at a convenient height for inspection and handling.

One of the particular advantages of the defined arrangement is that the work support is particularly well adapted to support the work piece during initial movement of the work piece into the broach. This is accomplished by providing conventional guide means for the piston rod at the upper end of the cylinder which due to its separation from the piston during the initial upstroke of the machine will support and guide the work piece during this initial movement. After the blank has moved a substantial distance into the broach so that the engagement between the broach and the partially broached work piece is increased, the movement and location of the work piece is accomplished substantially completely by the broaching tool.

While reference has been made to a pot broach assembly using rings, the present invention is of course equally applicable to a stick type pot broach in which the broach assembly consists of a series of individual elongated rectangular broach inserts; or arcuate slab type in which the assembly consists of a multiplicity of elongated sector broach elements; or peg type in which individual teeth are provided. The important consideration is that the cutting teeth are positioned in downwardly facing cutting position.

The present arrangement affords the best solution as regards rapid loading of the parts and the inverted "dish" principal provides the most ideal chip disposal system. This arrangement also simplifies the unloading or ejection problem which is accomplished simply by removing the finished gear from the work support at the position which it occupies at the end of the cutting stroke above the upper open end of the broaching tool.

I claim:

1. A pot broaching machine comprising
a frame,
an elongated generally tubular pot broach having open upper and lower ends and being fixedly mounted adjacent the top of the frame with its axis vertical,
an elongated power cylinder fixedly mounted on the frame directly beneath said broach with its axis vertical and parallel to the broach axis and having its upper end closely adjacent to the lower end of said broach,
a piston in said cylinder having a piston rod connected thereto and extending above said cylinder,
a work support at the upper end of said piston rod, an automatic loading mechanism located above the work support in the lower position thereof, said mechanism including;
means intermediate the upper end of said cylinder and the lower end of said broach for supporting a work piece above the work support on said piston rod for engagement thereby upon initial upward movement of said piston,
said piston being movable in said cylinder in a stroke to cause said work support to move from a clearance position below the lower end of said broach to a position above the upper end of said broach,
said broach comprising a housing having therein a multiplicity of longitudinally extending series of stepped downwardly directed cutting teeth,
the teeth being shaped to provide a chip receiving space directly beneath each cutting tooth from which chips may be dislodged for downward discharge after the work pieces have moved upwardly therebeyond.

2. A machine as defined in claim 1 in which said mechanism comprises a slide movable horizontally to move said work piece with its axis vertically disposed into position directly above the work support.

3. A machine as defined in claim 1 which comprises unloading mechanism located above the upper open end of said broach operable to receive a finished work piece and to retain it upon return downward movement of the work support.

4. A machine as defined in claim 1 in which the broach teeth are provided in a multiplicity of rings, each ring having at its inner surface a series of annularly arranged teeth, the teeth in adjacent rings being in longitudinal alignment.

* * * * *